March 12, 1957  D. A. KELLY  2,784,737
VENT FITTING
Filed Sept. 8, 1953
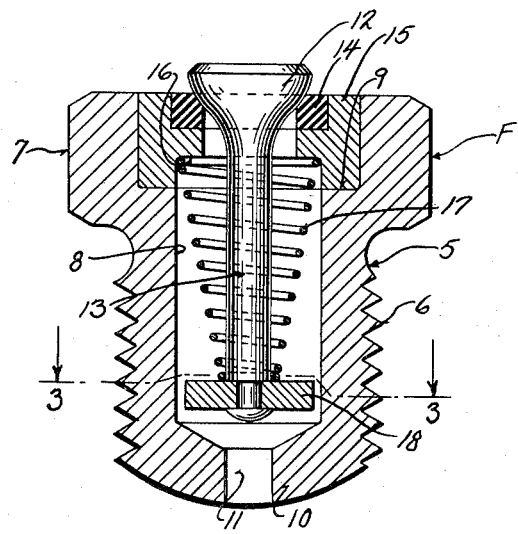
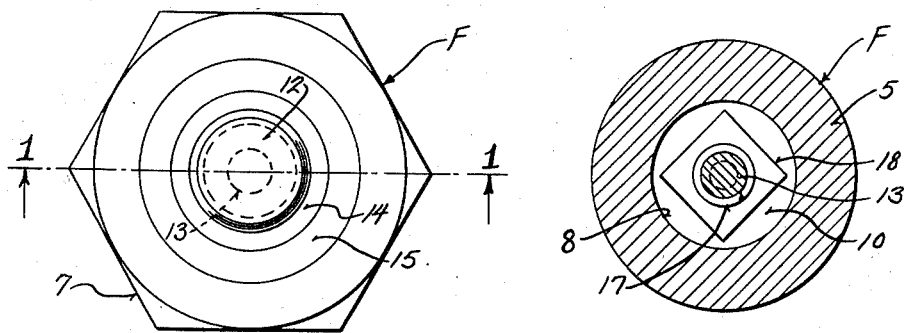
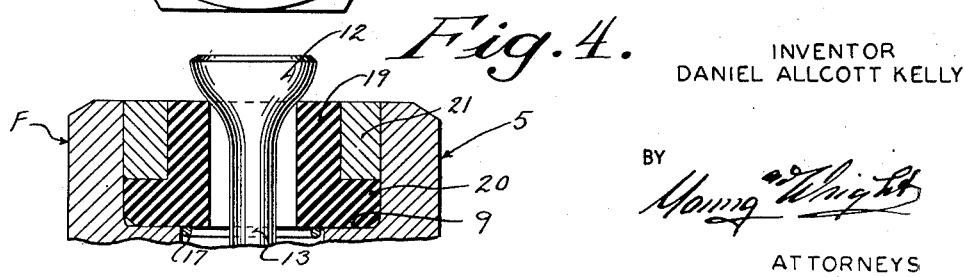
INVENTOR
DANIEL ALLCOTT KELLY
BY
ATTORNEYS

United States Patent Office 2,784,737
Patented Mar. 12, 1957

2,784,737
VENT FITTING

Daniel Allcott Kelly, Milwaukee, Wis., assignor to Lilian B. Kelly, Milwaukee, Wis.

Application September 8, 1953, Serial No. 378,723

1 Claim. (Cl. 137—540.11)

This invention appertains to relief valves and more particularly to vent fittings for use on the axle roller bearings of railroad rolling stock.

Roller bearings for flat cars and other railroad rolling stock are rapidly replacing solid bearings in journal boxes. The entire roller bearing is encased in a box, which is comparatively air tight to exclude dust and grit. As the box heats up, it develops an internal pressure that must be relieved in order to prevent this pressure from deteriorating or blowing out the lubricant seals of the bearings. Internal pressure such as this, in comparison to compressed air lines and the like is low, and relief valves now found in the open market are unsuitable for journal box work, in that they are bulky, and will not successfully handle low pressures.

It is, therefore, one of the primary objects of my invention to provide a vent valve for journal boxes which will be extremely sensitive in its operation and which will effectively hold its seat under light spring pressure.

Another salient object of the invention, is to provide a vent valve for the journal box having a novel resilient seat with a novelly shaped spring pressed valve body normally urged on the seat, so that under normal conditions, an intimate mating contact will be had between the valve body and its seat entirely around the mating surfaces.

A further object of my invention is to provide a resilient valve seat effectively supported and carried by a hard metal insert fitted within the casing or plug body of the vent fitting.

A further object of my invention is to provide a vent fitting embodying a casing or plug body for the valve which is so constructed that the working of metal parts (in case of breakage or the like) from the casing or plug into the box is prevented, so that injury to the bearing by foreign bodies is eliminated.

With these and other objects in view, the invention consists in the novel construction, arrangement and formation of parts, as will be hereinafter more specifically described and claimed, and illustrated in the accompanying drawing, in which drawings, Figure 1 is a longitudinal sectional view through one preferred embodiment of my improved vent fitting, the section being taken on the line 1—1 of Figure 2, looking in the direction of the arrows.

Figure 2 is an outer face view of the vent fitting.

Figure 3 is a cross-sectional view through the fitting taken on the line 3—3 of Figure 1, looking in the direction of the arrows.

Figure 4 is a fragmentary longitudinal sectional view similar to Figure 1, but showing a slightly modified form of resilient seat and means for holding the seat in place.

Referring to the drawing in detail, wherein similar reference characters designate corresponding parts throughout the several views, the letter F generally indicates the improved vent fitting, and the same embodies a casing or hollow plug body 5. This body has its inner end reduced in diameter and externally threaded as at 6, so that the same can be threaded into a vent opening formed in a journal box (not shown). The outer end of the body has its exterior surface of a polygonal shape, as at 7, whereby the same can be readily gripped by a wrench or the like. This body 5 is provided with an internal chamber 8 and the wall of this chamber at the outer end of the body is rabbeted to form a seat 9, the purpose of which will later appear. The inner end of the body has formed thereon a wall 10, and this wall is provided with a small vent opening 11, which functions to prevent the falling of matter from the chamber 8 into the box encasing the roller bearing, so that injury to the bearing by foreign metal pieces is prevented.

Arranged axially relative to the body 5 is a valve body 12 formed on the outer end of a stem 13. The valve body 12 flares outwardly from the stem 13, preferably in an arc of a circle, and this valve body is normally urged toward a soft resilient annular valve seat 14. The seat 14 can be made from neoprene, rubber or the like and preferably from a material that will not deteriorate from contact with oil. The resilient seat 14 is carried by a hard metal ring 15 or insert, which is rigidly secured into the casing or plug body 5 against the shoulder 9 by a press fit. This ring or insert 15 is channeled to form right angularly disposed walls against which is fitted the seat 14. The seat 14 can be molded into the ring or insert or can be secured therein by a selected adhesive. Directly inward of the channel formed for the resilient seat 14 is an annular shoulder 16 in the ring.

The valve body 12 is normally urged into intimate contact with its seat 14 by a light helical spring 17. This spring is coiled about the stem 13 and the outer larger end thereof rests against the shoulder 16 of the insert 15. The extreme inner end of the valve stem 13 is reduced in diameter and has fitted thereon a stop washer 18. The inner end of the stem is upset or peened over the stop washer 18. The smaller inner end of the spring 17 bears against the stop washer 18 closely to the axial center thereof. The spring 17 being confined between the insert 15 and the washer 18 holds the valve body 12 down against the resilient seat and compresses the seat to a certain extent to obtain the desired intimate contact and the spring also functions to center and hold the valve body in correct position relative to the seat. It should be noted that this conical shape of the spring 17 as shown in Figure 1 of the drawing is provided so that there will be no friction drag of the spring on the inner walls of the fitting which might disrupt the opening and closing specifications of the fitting.

In the assembly of the fitting, the valve body 12 and its stem 13, the spring 17 and other parts, are associated with the ring or insert 15 prior to the fitting of the ring or insert in the casing or plug body 5, and with the exception of the extreme outer end of the valve body 12 all parts are encased within the plug body 5.

When pressure develops in the box encasing a roller bearing with which the fitting is associated, such pressure (when a certain limit is reached), acting on the inner end of the valve body 12 will overcome the tension of the spring 17 and move the valve body from off of its seat to relieve the pressure, and as soon as such pressure is relieved, the valve body will immediately and automatically reseat itself and the valve seat will give to insure such seating.

The shape of the top of the stem 13 and the outer configuration of the valve body 12 is such, that not only is a good seat created but so that the stem and body will effectively move any foreign matter accumulating on the seat out of the way with the least possible resistance to the inward movement of the valve body.

The valve body protrudes slightly beyond the plane of the outer face of the fitting, and consequently workmen may attempt to force the valve body into the resilient seat.

Should this happen, the valve will not open when a desired pressure is reached.

To overcome this possibility, the diameter of the washer 18 is such, that the same acts as a stop to limit the inward movement of the valve body and stem. The washer is spaced slightly from the inner surface of the wall 10 and will contact this wall if effort is made to press the valve in beyond a certain limit.

The outer surface of the wall 10 is preferably of a dome shape so that when the fitting is threaded in place in the box, the curvature of the outer face of the wall will tend to shed grease and other foreign matter and to prevent the accumulation of grease or other foreign matter around the vent fitting.

As illustrated in Figure 4, various other means can be provided for securely holding the resilient valve seat in place other than that shown in Figure 1. In Figure 4, I provide an annular sleeve-like resilient valve seat, and the inner end of the sleeve has formed thereon an outwardly extending flange 20. The seat 19 and its flange 20 are fitted against the shoulder 9 in the plug body 5 and the resilient valve seat is held in the plug body 5 and against the shoulder 9 by pressing into the body a steel or like retaining ring 21. The ring fits down tight against the flange 20. The use of the retaining ring 21 eliminates the necessity of securing the seat 14, as shown in Figure 1 by adhesives to the insert 15. The retaining ring 21 eliminates any possibility of the neoprene or resilient seat becoming loose in service.

In the type of fitting shown in Figure 4, the desired size of opening at the end of the plug body is used (as in Figure 1) so that if anything should happen to the spring, plunger or washer, these parts could not pass through the opening into the bearing.

Changes in details may be made without departing from the spirit or the scope of this invention, but what I claim as new is:

In a vent fitting for the housings of the roller bearings of a journal comprising a plug body having an interior chamber, the wall of the chamber at the outer end of the plug body being rabbeted, a hard metal ring rigidly fitted in the body against the walls of the rabbet having an internal channel defining right angularly extending walls, a soft resilient valve seat fitted in the rabbet in intimate contact with the walls, a valve body adapted to engage and compress the seat, a stem on said valve body extending into the chamber, a stop member on the inner end of the stem, a helical spring conical in shape coiled about the stem confined between the stop member and the ring for normally holding the valve body centered relative to the ring and in intimate contact with the seat, and an inner wall proximate to said stop member when the valve body is seated and provided with a small vent opening of a less size than the stop member whereby said stop member will engage the inner face of said wall when said valve body and stem are moved a predetermined distance into the body of the fitting beyond the normal seating position of the valve body, and said wall having an outer dome shape.

References Cited in the file of this patent

UNITED STATES PATENTS

| | | |
|---|---|---|
| 350,378 | Mayer | Oct. 5, 1886 |
| 1,093,576 | McNutt | Apr. 14, 1914 |
| 1,695,722 | Smith | Dec. 18, 1928 |
| 1,994,770 | King | Mar. 19, 1935 |
| 2,241,758 | Baldwine | May 13, 1941 |
| 2,344,657 | Thiel | Mar. 21, 1944 |
| 2,539,989 | Campbell | Jan. 30, 1951 |
| 2,662,348 | Jacobsson | Dec. 15, 1953 |